United States Patent
Filsfils et al.

(10) Patent No.: US 11,483,230 B2
(45) Date of Patent: Oct. 25, 2022

(54) MULTIPLE DOMAIN SEGMENT ROUTING PATH COMPUTATION

(71) Applicant: Cisco Technology, Inc., San Jose, CA (US)

(72) Inventors: Clarence Filsfils, Brussels (BE); Francois Clad, Strasbourg (FR); Muthurajah Sivabalan, Kanata (CA); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 16/579,578

(22) Filed: Sep. 23, 2019

(65) Prior Publication Data

US 2021/0092043 A1 Mar. 25, 2021

(51) Int. Cl.

| | |
|---|---|
| *H04L 45/02* | (2022.01) |
| *H04L 45/00* | (2022.01) |
| *H04L 45/44* | (2022.01) |
| *H04L 45/586* | (2022.01) |
| *H04L 45/64* | (2022.01) |
| *H04L 61/30* | (2022.01) |

(52) U.S. Cl.
CPC .............. *H04L 45/04* (2013.01); *H04L 45/22* (2013.01); *H04L 45/44* (2013.01); *H04L 45/586* (2013.01); *H04L 45/64* (2013.01); *H04L 61/30* (2013.01)

(58) Field of Classification Search
CPC ......... H04L 45/04; H04L 45/22; H04L 45/44; H04L 45/586; H04L 45/64; H04L 61/30
USPC ....................................................... 370/392
See application file for complete search history.

(56) References Cited

U.S. PATENT DOCUMENTS

| | | | |
|---|---|---|---|
| 8,259,564 B1 | 9/2012 | Gredler et al. | |
| 10,917,330 B1* | 2/2021 | Szarecki | ............... H04L 45/507 |
| 2008/0002664 A1 | 1/2008 | Li et al. | |
| 2014/0269699 A1* | 9/2014 | Filsfils | .................... H04L 45/54 |
| | | | 370/389 |

(Continued)

OTHER PUBLICATIONS

Sarkar et al "Anycast Segments in MPLS based Segment Routing draft-ietf-spring-mpls-anycast-segments-02", Jan. 9, 2018, ietf.org, draft segments-02, p. 2-3 (Year: 2018).*

(Continued)

*Primary Examiner* — Kwang B Yao
*Assistant Examiner* — Xuan Lu
(74) *Attorney, Agent, or Firm* — Patterson + Sheridan, LLP

(57) ABSTRACT

Aspects described herein include a method for use with a software-defined network controller, as well as an associated computer program product and system. The method comprises assigning a segment identifier to an endpoint node within a destination domain of a plurality of domains. Adjacent domains of the plurality of domains are connected via a respective set of two or more domain border routers. The method further comprises assigning a respective segment identifier to each domain. Each domain border router advertises the segment identifiers of the respective two adjacent domains. The method further comprises, responsive to a request from a headend node within a source domain of the plurality of domains, computing a path from the headend node to the endpoint node. The path includes (i) the segment identifiers of any domains between the headend node and the endpoint node, and (ii) the segment identifier of the endpoint node.

12 Claims, 5 Drawing Sheets

(56) References Cited

U.S. PATENT DOCUMENTS

| | | | |
|---|---|---|---|
| 2015/0043383 A1* | 2/2015 | Farkas | H04L 45/12 370/254 |
| 2015/0304206 A1* | 10/2015 | Filsfils | H04L 45/04 709/238 |
| 2017/0346718 A1 | 11/2017 | Psenak et al. | |
| 2019/0132281 A1 | 5/2019 | Sawyer et al. | |
| 2020/0351188 A1* | 11/2020 | Arora | H04L 43/10 |
| 2021/0320861 A1* | 10/2021 | Dutta | H04L 45/22 |

OTHER PUBLICATIONS

Alcatel-Lucent Technology White Paper, "Segment Routing and Path Computation Element," Publication Date May 13, 2015 [www.tmcnet.com], 28 pages.

Filsfils et al. "Anycast segments in MPLS based segment routing draft-ietf-spring-mpls-anycast-segments-02," Jan. 29, 2018 [tools.ietf.org] 19 pages.

Juniper Networks, "Understanding adjacency segments, anycast segments, and configurable SRGB in SPRING," Mar. 1, 2019, 5 pages [www.juniper.net].

Juniper Networks, "Example: configuring Anycast and prefix segments in SPRING for IS-IS to increase network speed," Mar. 11, 2019, 22 pages [www.juniper.net].

Cisco, "Segment Routing Configuration Guide," Apr. 5, 2018, 202 pages [www.cisco.com].

* cited by examiner

MULTIPLE DOMAIN SEGMENT ROUTING PATH COMPUTATION

TECHNICAL FIELD

Embodiments presented in this disclosure generally relate to segment routing (SR), and more specifically, to techniques for path computation for segment routing across multiple domains.

BACKGROUND

Segment routing (SR) is a flexible, scalable technique for performing source routing, where a sender of a packet may partially or completely specify the path that the packet takes through the network. Once selected, the source encodes the path in a header of the packet, where each segment of the path may have an identifier. "Anycast" segment identifiers (SIDs) may be used for load-balancing and redundancy along certain segments of the path.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
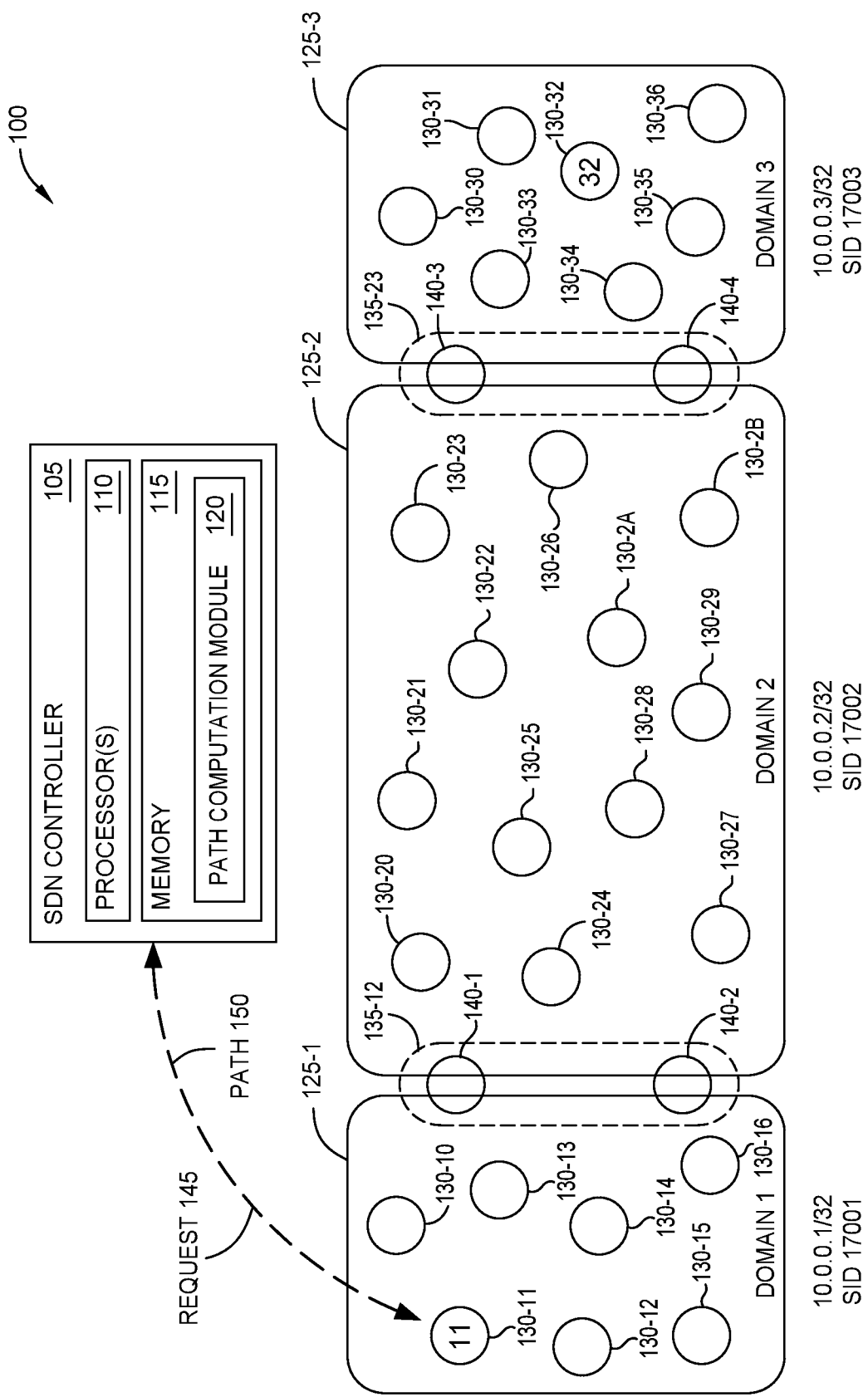
FIG. 1 is an exemplary software-defined network (SDN) having multiple domains, according to one or more embodiments.

One embodiment presented in this disclosure is method for use with a software-defined network controller. The method comprises assigning a segment identifier to an endpoint node within a destination domain of a plurality of domains. Adjacent domains of the plurality of domains are connected via a respective set of two or more domain border routers. The method further comprises assigning a respective segment identifier to each domain of the plurality of domains. Each domain border router advertises the segment identifiers of the respective two adjacent domains. The method further comprises, responsive to a request from a headend node within a source domain of the plurality of domains, computing a path from the headend node to the endpoint node. The path includes (i) the segment identifiers of any domains between the headend node and the endpoint node, and (ii) the segment identifier of the endpoint node.

Another embodiment presented in this disclosure is a computer program product for use with a software-defined network controller. The computer program product comprises a computer-readable storage medium having computer-readable program code embodied therewith. The computer-readable program code is executable by one or more computer processors to perform an operation comprising assigning a segment identifier to an endpoint node within a destination domain of a plurality of domains. Adjacent domains of the plurality of domains are connected via a respective set of two or more domain border routers. The operation further comprises assigning a respective segment identifier to each domain of the plurality of domains. Each domain border router advertises the segment identifiers of the respective two adjacent domains. The operation further comprises, responsive to a request from a headend node within a source domain of the plurality of domains, computing a path from the headend node to the endpoint node. The path includes (i) the segment identifiers of any domains between the headend node and the endpoint node, and (ii) the segment identifier of the endpoint node.

Another embodiment presented in this disclosure is a system comprising a plurality of network devices arranged in a plurality of domains. The plurality of network devices comprises one or more sets of domain border routers. Each set comprises a respective two or more domain border routers between two adjacent domains. The plurality of network devices further comprises a headend node in a source domain, and an endpoint node in a destination domain. The system further comprises a network controller configured to assign a segment identifier to the endpoint node, and assign a respective segment identifier to each domain of the plurality of domains. Each domain border router advertises the segment identifiers of the two adjacent domains. The network controller is further configured to compute a path from the headend node to the endpoint node. The path includes (i) the segment identifiers of any domains between the headend node and the endpoint node, and (ii) the segment identifier of the endpoint node.

Example Embodiments

Anycast SIDs may be used for load-balancing and redundancy along certain segments of a computed path. For example, if two or more nodes of an anycast group are at the same closest distance, traffic is automatically load-balanced between the two or more nodes. Additionally, if the closest node in the anycast group becomes unreachable, traffic is automatically rerouted to the next closest node in the anycast group.

For network topologies spanning multiple domains, anycast SIDs may be configured on domain border routers to serve as a gateway for two adjacent domains. However, usage of anycast SIDs when dynamically computing SR paths can be complex. Specifically, the path computation algorithm must ensure that equivalent connectivity is available on both sides of the anycast SID, and that the use of an anycast SID (e.g., instead of a node SID) does not cause traffic to be directed along a sub-optimal path. The complexity may still be greater when several anycast SIDs are chained together in a SID list.

Computing a SR path may be comparable to solving a shortest-path calculation problem for a graph, where each vertex represents a router and each represents a segment. The complexity of the calculation problem may be proportional to the count of vertices and edges included in the graph. Thus, in large networks, calculating the SR path may require a substantial amount of time. Accounting for anycast segments may further increase the complexity of the calculation problem.

According to embodiments described herein, a software-defined network (SDN) controller assigns a segment identifier to an endpoint node within a destination domain of a plurality of domains, wherein adjacent domains of the plurality of domains are connected via a respective set of two or more domain border routers. The SDN controller assigns a respective segment identifier to each domain of the plurality of domains, wherein each domain border router advertises the segment identifiers of the respective two adjacent domains. Responsive to a request from a headend node within a source domain of the plurality of domains, the SDN controller computes a path from the headend node to the endpoint node, wherein the path includes (i) the segment identifiers of any domains between the headend node and the endpoint node, and (ii) the segment identifier of the endpoint node. The respective segment identifier assigned to each domain may be a respective anycast domain segment identifier. In some embodiments, the path is represented as a stack of labels that are transmitted to the headend node and ultimately written into a header of one or more packets. In some embodiments, the SDN controller assigns a respective segment identifier to each domain for those cases where no service-level agreement (SLA) is required.

Beneficially, using the segment identifier(s) for each of the plurality of domains can significantly reduce a size of the representation of the path (e.g., the stack of labels, which may also be referred to as a segment list or SID list). For example, although each domain may be represented as a single vertex in the graph despite including tens or hundreds of routers. Due to various hardware limitations, controlling the size of the representation can be important to ensure compatibility across many different types of routers. Further, the reduced complexity of the path calculation using the segment identifier(s) for each of the plurality of domains can increase the scale of a segment routing path computation module by at least 2.

FIG. 1 is an exemplary software-defined network (SDN) 100 having multiple domains, according to one or more embodiments. The SDN 100 comprises a plurality of routers 130-10, 130-11, . . . , 130-16, 130-20, 130-21, . . . 130-2B, 130-30, 130-31, . . . , 130-3B (generically referred to as router(s) 130). Each of the routers 130 represents a respective node of the SDN 100, and generally comprises computer hardware that is configured to transmit data packets between networks via electrical signals and/or optical signals. Each of the routers 130 may be implemented in any suitable form. Some non-limiting examples of the routers 130 include core routers, enterprise routers, residential gateways, and so forth.

A SDN controller 105 controls the routing of data packets between nodes of the SDN 100 through dynamically configuring the SDN 100. The SDN controller 105 comprises one or more processors 110 and a memory 115, and is communicatively coupled with each of the routers 130. The one or more processors 110 may be implemented in any suitable form, such as a general purpose microprocessor, a controller, an application-specific integrated circuit (ASIC), and so forth. The memory 115 may include a variety of computer-readable media selected for their size, relative performance, or other capabilities: volatile and/or non-volatile media, removable and/or non-removable media, etc.

The memory 115 may include one or more "modules" for performing various functions described herein. In one embodiment, each module includes program code that is executable by the one or more processors 110. However, other embodiments may have functionality that is partially or fully implemented in hardware (i.e., circuitry) or firmware of the SDN controller 105. As shown, the SDN controller 105 comprises a path computation module 120 that computes a path 150 for a packet to be transmitted from a headend node 11 to an endpoint node 32 through the SDN 100. In the example depicted in FIG. 1, the router 130-11 represents the headend node 11, and the router 130-32 represents the endpoint node 32.

In some embodiments, the path computation module 120 receives, from the headend node 11, a request 145 to generate the path 150 for transmitting a packet from the headend node 11 to the endpoint node 32. The path computation module 120 computes the path 150 and transmits the path 150 to the headend node 11. In some embodiments, the headend node 11 writes the path 150 as one or more Multiprotocol Label Switching (MPLS) labels into a MPLS header included in an IPv4 packet. In other embodiments, the headend node 11 writes the path 150 to a Segment Routing Header of an IPv6 packet.

In some embodiments, each of the routers 130 in the SDN 100 is assigned by a SDN controller 105 to a respective domain of a plurality of domains 125-1 ("Domain 1"), 125-2 ("Domain 2"), 125-3 ("Domain 3") (generically referred to as domain(s) 125). Within each domain 125, a respective interior gateway protocol (IGP) is used to support communication between the nodes of the domain 125. Any suitable IGPs are contemplated. Some non-limiting examples of IGPs include Open Shortest Path First (OSPF), Routing Information Protocol (RIP), Intermediate System to Intermediate System (IS-IS), and Enhanced Interior Gateway Routing Protocol (EIGRP). In other embodiments, the assignment of some or all of the routers 130 within the domain configuration may be manually entered, e.g., by a network operator.

Thus, each domain 125 may represent a respective IGP area, level, instance, or autonomous system (AS). Each of the routers 130, which is configured as part of the respective IGP area, level, etc., report this information to the SDN controller 105, as well as others of the routers 130. The SDN controller 105 may reconstruct the entire multi-domain topology based on the information received from the routers 130 (whether directly or via an aggregator).

In the example depicted in FIG. 1, the domain 125-1 represents a source domain (including the headend node 11), the domain 125-3 represents a destination domain (including the endpoint node 32), and the domain 125-2 represents an intermediate domain. The domain 125-1 is adjacent to the domain 125-2, and the domain 125-3 is adjacent to the domain 125-2. Although three (3) domains 125 are illustrated, other embodiments may include greater numbers of domains 125.

The SDN 100 further comprises a plurality of domain border routers 140-1, 140-2, 140-3, 140-4 (generically referred to as domain border router(s) 140) that have been assigned by the SDN controller 105. Generally, the domain border routers 140 may be configured similarly to the routers 130, comprising computer hardware that is configured to transmit data packets between networks via electrical signals and/or optical signals. In some embodiments, each domain border router 140 is one of: a router that is configured with links in different domains 125 (e.g., the domain boundary is defined on the router itself), and a router that has a direct connectivity to a router in a different domain 125 (e.g., the domain boundary is defined on a link terminating at this router).

Adjacent domains are connected via a respective set of two or more domain border routers 140. As shown, the domains 125-1, 125-2 are connected by a set 135-12 comprising the domain border routers 140-1, 140-2, and the domains 125-2, 125-3 are connected by a set 135-23 comprising the border routers 140-3, 140-4.

In some embodiments, each of the domains 125 is assigned a respective Internet Protocol (IP) prefix and segment identifier (SID) by the SDN controller 105. As shown, each of the domains 125 is assigned an IP prefix (10.0.0.k/32), where k represents the domain ID, and an anycast domain SID (17000+k). Thus, Domain 1 is assigned 10.0.0.1/32 and 17001, Domain 2 is assigned 10.0.0.2/32 and 17002, and Domain 3 is assigned 10.0.0.3/32 and 17003. In this way, each domain 125 may be abstracted using its respective anycast domain SID. Other assignment schemes are also contemplated.

Figure 4:
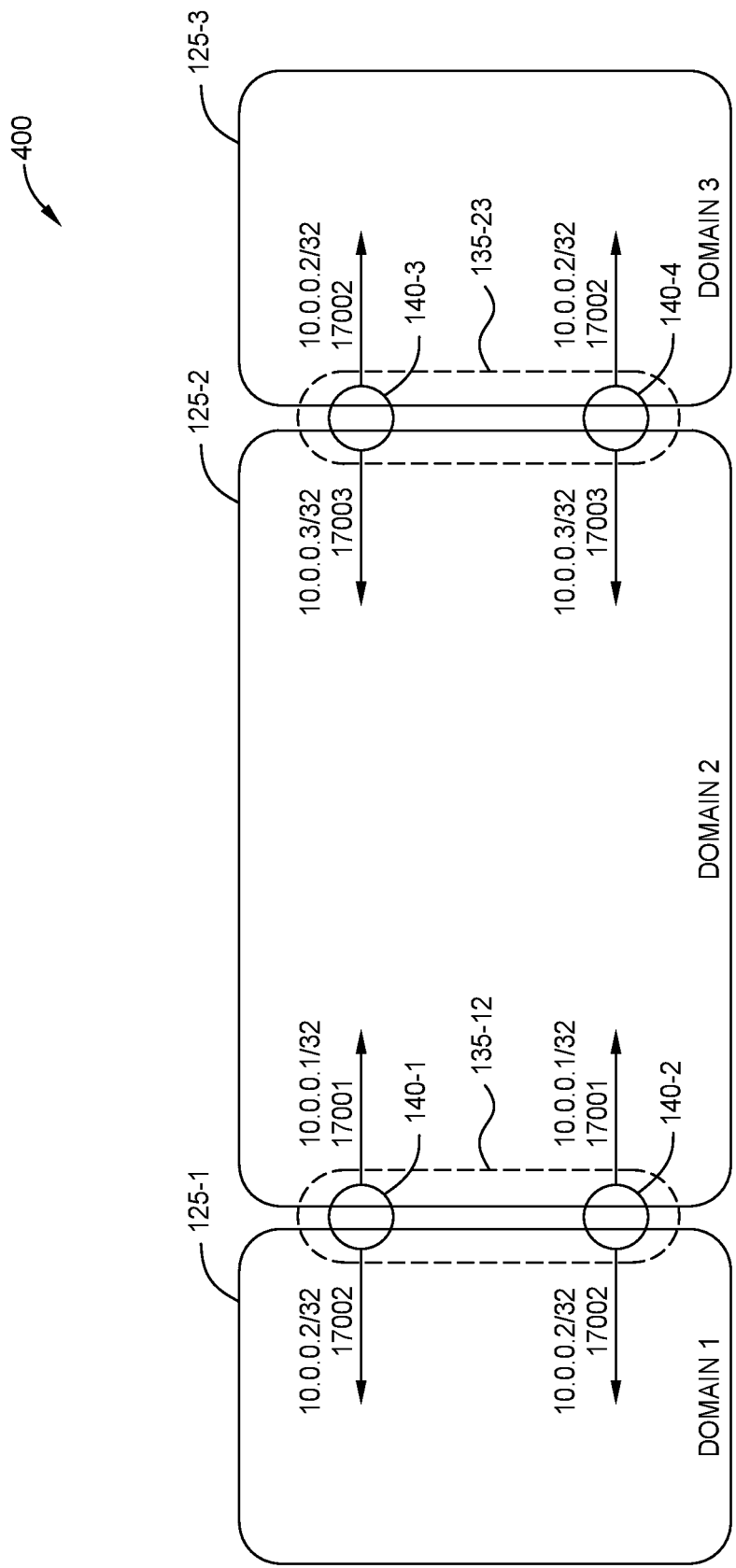
FIG. 4 illustrates advertising segment identifiers by domain border routers, according to one or more embodiments.

In some embodiments, each domain border router 140 advertises the anycast domain SID for each adjacent connected domain into the other adjacent connected domain(s). Referring now to diagram 400 of FIG. 4, the domain border routers 140-1, 140-2 each advertise the IP prefix and SID of Domain 2 (10.0.0.2/32, 17002 respectively) to the nodes of Domain 1, and the IP prefix and SID of Domain 1 (10.0.0.1/32, 17001 respectively) to the nodes of Domain 2. The domain border routers 140-3, 140-4 each advertise the IP prefix and SID of Domain 2 (10.0.0.2/32, 17002 respectively) to the nodes of Domain 3, and the IP prefix and SID of Domain 3 (10.0.0.3/32, 17003 respectively) to the nodes of Domain 2.

In some embodiments, the advertisement of the connected domain confirms or otherwise indicates that the domain is accessible through the domain border router. Thus, by advertising the IP prefix and SID of Domain 2, the domain border router 140-1 confirms that the nodes of Domain 2 are accessible through the domain border router 140-1. Should the domain border router 140-1 stop advertising the IP prefix and SID of Domain 2, this indicates that the nodes of Domain 2 are not accessible. In this way, the path computation module 120 in some embodiments computes the path 150 responsive to whether the advertisement(s) of the connected domain(s) are received.

In some embodiments, the SDN controller 105 receives a best-effort path calculation request from the headend node 11 to the endpoint node 32. In response to the request, the path computation module 120 computes a derived graph and/or the path 150. In some embodiments, the path computation module 120 computes the derived graph from the original topology of the SDN network 100. In some embodiments, computing the derived graph comprises assigning the two or more domain border routers 140 of each set 135 to a respective virtual node, which is then associated with the IP prefix and SID of the downstream domain 125. Thus, for the set 135-12, the domain border routers 140-1, 140-2 are assigned to a single virtual node associated with the IP prefix and SID of Domain 2.

In some embodiments, computing the derived graph further comprises removing all of the physical nodes from the source domain except for the headend node and any virtual nodes, and removing all of the physical nodes from one or more intermediate domains except for any virtual nodes. In some embodiments, computing the derived graph further comprises adding links from the headend node to each of one or more first virtual nodes of the source domain, and adding links between each of one or more second virtual nodes in the one or more intermediate domains.

In some embodiments, the path computation module 120 computes the path 150 based on the derived graph. In some embodiments, the path 150 is represented as a stack of labels comprising anycast domain segment identifiers of any domains between the headend node and the endpoint node, and the segment identifier of the endpoint node. The anycast domain segment identifiers configure the domain border routers to forward traffic along a shortest interior gateway path through the respective domains. In some embodiments, the path 150 comprises a sequence of anycast domain SIDs, followed by a Prefix SID (containing the IP prefix) to reach the endpoint node in the destination domain.

Figure 2:
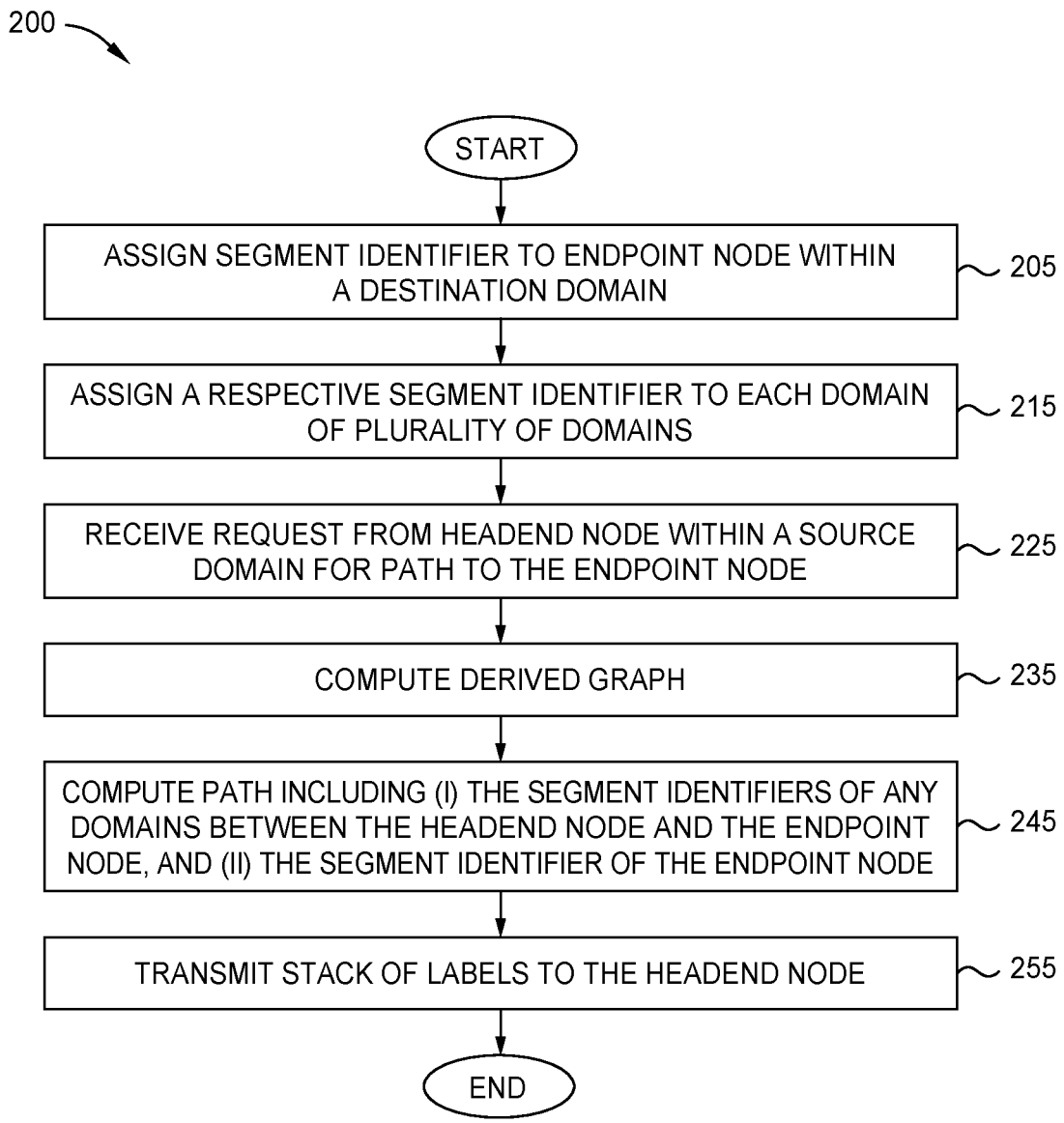
FIG. 2 is an exemplary method for use with a SDN controller, according to one or more embodiments.

FIG. 2 is an exemplary method 200 for use with a SDN controller, according to one or more embodiments. The method 200 may be used in conjunction with other embodiments, e.g., performed by the SDN controller 105 of FIG. 1.

The method 200 begins at block 205, where a segment identifier is assigned to an endpoint node within a destination domain of the SDN. At block 215, a segment identifier is assigned to each domain of a plurality of domains of the SDN. At block 225, a request is received from a headend node within a source domain of the SDN for a path to the endpoint node.

At block 235, a derived graph is computed responsive to receiving the request. At block 245, a path is computed responsive to receiving the request. The path includes (i) the segment identifiers of any domains between the headend node and the endpoint node, and (ii) the segment identifier of the endpoint node.

At block 255, a stack of labels representing the path is transmitted from the SDN controller to the headend node. The method 200 ends following completion of block 255.

Figure 3:
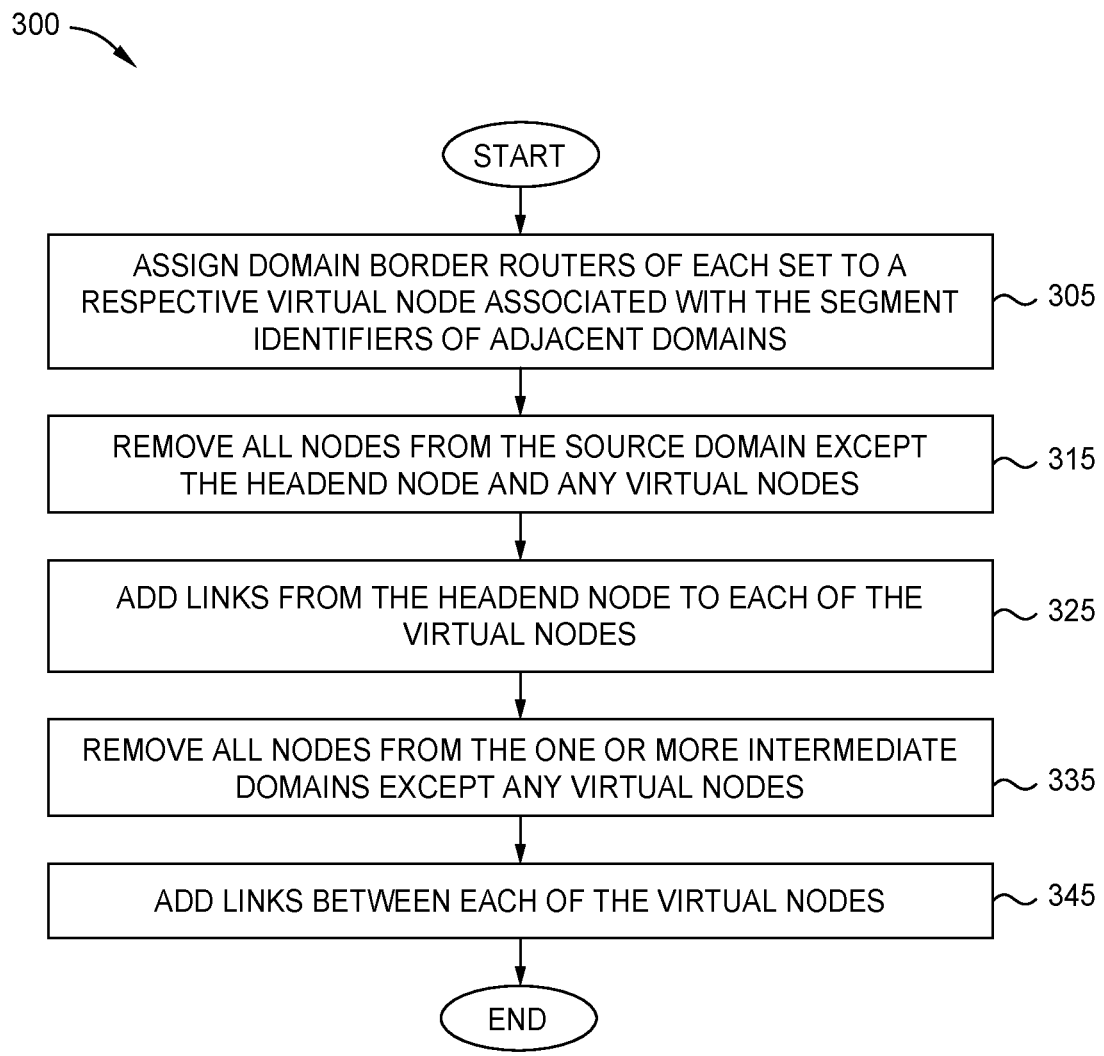
FIG. 3 is an exemplary method of computing a derived graph, according to one or more embodiments.

FIG. 3 is an exemplary method 300 of computing a derived graph, according to one or more embodiments. The method 300 may be used in conjunction with other embodiments, e.g., as part of block 235 of FIG. 2.

The method 300 begins at block 305, where two or more domain border routers of each set (connecting two adjacent domains) are assigned to a respective virtual node associated with the segment identifiers of one of the adjacent domains. In some embodiments, the virtual node is associated with the IP prefix and SID of the downstream domain 125.

At block 315, all nodes from the source domain are removed, except for the headend node and any virtual nodes. At block 325, links are added from the headend node to each of the virtual nodes of the source domain. At block 335, all nodes from the one or more intermediate domains are removed, except for any virtual nodes. At block 345, links are added between each of the virtual nodes of the intermediate domains. The method 300 ends following completion of block 345.

Figure 5:
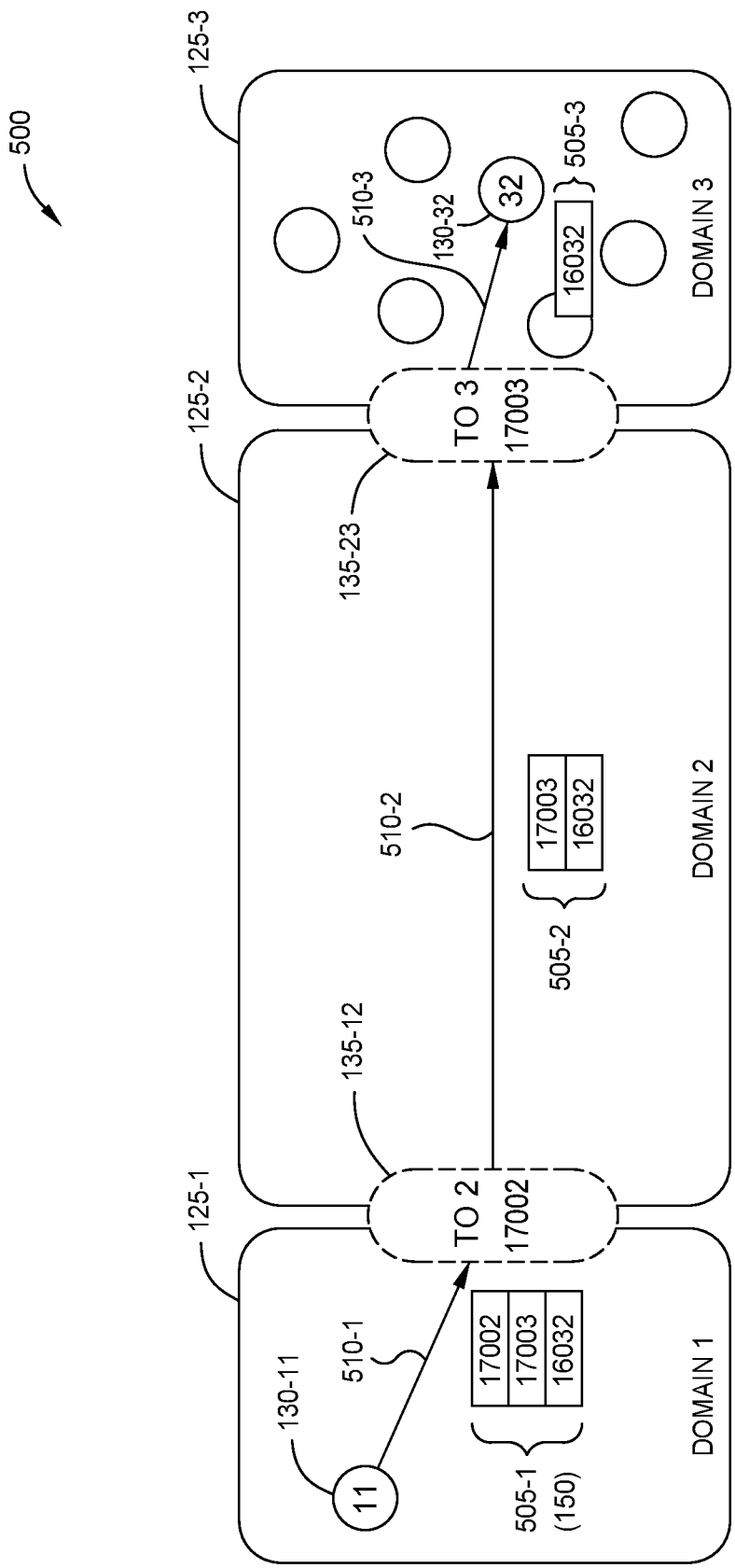
FIG. 5 illustrates routing traffic across multiple domains, according to one or more embodiments.

FIG. 5 illustrates routing traffic across multiple domains, according to one or more embodiments. More specifically, diagram 500 represents an example of Multiprotocol Label Switching Segment Routing (SR-MPLS). The features illustrated in FIG. 5 may be used in conjunction with other embodiments, e.g., representing an exemplary operation of the path computation module 120 of FIG. 1.

Upon receiving a best-effort path calculation request from a headend node 11 (i.e., the router 130-11) in Domain 1 for routing traffic to an endpoint 32 (i.e., the router 130-32) in Domain 3 (FIG. 3), the path computation module 120 computes the derived graph and the path. The path computation module 120 returns, to the headend node 11, a first SID list 505-1 representing the path 150. In SR-MPLS, the first SID list 505-1 may be represented as a stack of MPLS labels, where each MPLS label is a 20-bit value. The packets are forwarded by each router (including the headend node 11) according to the first ("top") label of the stack. When forwarding the packets, each router may either leave the top label in place, or may remove ("pop") it. Generally, the pop operation occurs when the packet arrives at the particular node where the SID/label was instantiated.

As shown, the first SID list 505-1 includes the labels <17002, 17003, 16032>, where the label 17002 represents the anycast domain SID of Domain 2 (an intermediate domain), the label 17003 represents the anycast domain SID of Domain 3 (the destination domain), and the label 16032 represents the Node SID of the endpoint node 32. Stated another way, the SID/label 17002 is instantiated on the nodes corresponding to the domain border routers 140-1, 140-2, the SID/label 17003 is instantiated on the nodes corresponding to the domain border routers 140-3, 140-4, and the SID/label 16032 is instantiated on the endpoint node 32.

In this example, the label 17002 is associated with the prefix 10.0.0.2/32 and is advertised by both domain border routers of the set 135-12 (domain border routers 140-1, 140-2), and the packets will thus be forwarded by each router in Domain 1 on the shortest path to either domain border router 140-1 or domain border router 140-2, whichever is closest. Upon reaching one of these nodes, the top label is removed ("popped") in order to expose the next label. The packets are then forwarded according to the new top label.

As packets are forwarded through Domain 1 (e.g., from the headend node 11 to a node in the set 135-12), the packets include the label stack <17002, 17003, 16032>, where the label 17002 is the top label. The top label configures the nodes of Domain 1 to direct the traffic along a shortest path 510-1, according to the IGP applied in Domain 1. Any intermediate nodes (routers) within Domain 1 leave the top label in place when forwarding. Upon arriving at a node in the set 135-12 (e.g., a domain border router 140), the top label is removed, and the label 17003 becomes the new top label. Thus, the first SID list 505-1 is edited to a second SID list 505-2 including the labels <17003, 16032> by removing the label 17002. The second SID list 505-2 is written to the traffic, e.g., into a MPLS header or a Segment Routing Header of packet(s) included in the traffic.

As packets are forwarded through Domain 2 (e.g., from a node in the set 135-12 to a node in the set 135-23), the packets include the label stack <17003, 16032>, where the label 17003 is the top label. The top label configures the nodes of Domain 2 to direct the traffic along a shortest path 510-2, according to the IGP applied in Domain 2. Any intermediate nodes (routers) within Domain 2 leave the top label in place when forwarding. Upon arriving at a node in the set 135-23 (e.g., a domain border router 140), the top label is removed, and the label 16032 becomes the new top label. Thus, the second SID list 505-2 is edited to a third SID list 505-3 including the label <16032> by removing the label 17003, and the label 16032 becomes the new top label. The third SID list 505-3 is written to the traffic. Finally, the label 16032 configures the nodes of Domain 3 to direct the traffic along a shortest path 510-3 according to the IGP applied in Domain 3, to the endpoint node 32.

Although described in terms of SR-MPLS, the features illustrated in the diagram 500 may be applied to other SR protocols. For example, in Internet Protocol version 6 (IPv6) Segment Routing (SRv6), each SID is represented as an IPv6 address (e.g., 128-bit value) and the SID list is imposed onto the packet by adding a Segment Routing header (SRH) attached to an IPv6 header (the IPv6 header may be pre-existing in the packet or added at the same time as the SRH). The first SID in the SID list is copied into the Destination Address (DA) field of the IPv6 header. The packets are then forwarded by each router like any regular IPv6 packet, according to their destination address. Once the packets reach that destination address, the SRH is inspected and the next SID is copied into the IPv6 DA field, replacing the previous one. In contrast to MPLS, previous SIDs are not popped or removed from the packet header, but the value stored in the SRH indicates the index of the next SID to be processed. The value stored in the SRH is updated every time the DA is replaced.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for use with a software-defined network controller, the method comprising:
    assigning a segment identifier to an endpoint node within a destination domain of a plurality of domains, wherein the plurality of domains comprises a source domain, the destination domain, and one or more intermediate domains between the source domain and the destination domain, wherein the source domain and a first intermediate domain are connected by a first domain border router and a second domain border router;
    assigning a respective segment identifier to each domain of the plurality of domains, wherein each of the first domain border router and the second domain border router advertises both the segment identifier of the source domain and the segment identifier of the first intermediate domain;
    responsive to a request from a headend node within the source domain, computing a derived graph, wherein computing the derived graph comprises:
        assigning the first domain border router and the second domain border router to a first virtual node associated with the segment identifiers of the source domain and the first intermediate domain;
        removing, from the derived graph, all nodes from the source domain except the headend node and the first virtual node; and
        removing, from the derived graph, all nodes from the first intermediate domain except any virtual nodes; and
    computing a path from the headend node to the endpoint node based on the derived graph, wherein the path includes (i) segment identifiers of the one or more intermediate domains including the segment identifier of the first intermediate domain, (ii) the segment identifier of the destination domain, and (iii) the segment identifier of the endpoint node.

2. The method of claim 1, wherein assigning the respective segment identifier to each domain of the plurality of domains comprises assigning a respective anycast domain segment identifier.

3. The method of claim 2, further comprising:
    responsive to computing the path, transmitting a stack of labels to the headend node comprising (i), (ii), and (iii), wherein the stack of labels configures the first domain border router and the second domain border router to forward traffic along a shortest interior gateway path through the respective domains.

4. The method of claim 1, wherein the source domain comprises the first virtual node and the first intermediate domain comprises the first virtual node and a second virtual node, the method further comprising:
    adding a link from the headend node to the first virtual node; and
    adding a link between the first virtual node and the second virtual node.

5. A computer program product for use with a software-defined network controller, the computer program product comprising a non-transitory computer-readable storage medium having computer-readable program code embodied therewith, the computer-readable program code executable by one or more computer processors to perform an operation comprising:
    assigning a segment identifier to an endpoint node within a destination domain of a plurality of domains, wherein the plurality of domains comprises a source domain, the destination domain, and one or more intermediate domains between the source domain and the destination domain, wherein the source domain and a first intermediate domain are connected by a first domain border router and a second domain border router;

assigning a respective segment identifier to each domain of the plurality of domains, wherein each of the first domain border router and the second domain border router advertises both the segment identifier of the source domain and the segment identifier of the first intermediate domain;

responsive to a request from a headend node within the source domain, computing a derived graph, wherein computing the derived graph comprises:

assigning the first domain border router and the second domain border router to a first virtual node associated with the segment identifiers of the source domain and the first intermediate domain;

removing, from the derived graph, all nodes from the source domain except the headend node and the first virtual node; and removing, from the derived graph, all nodes from the first intermediate domain except any virtual nodes; and computing a path from the headend node to the endpoint node, wherein the path includes (i) segment identifiers of the one or more intermediate domains including the segment identifier of the first intermediate domain, (ii) the segment identifier of the destination domain, and (iii) the segment identifier of the endpoint node.

6. The computer program product of claim 5, wherein assigning the respective segment identifier to each domain of the plurality of domains comprises assigning a respective anycast domain segment identifier.

7. The computer program product of claim 6, the operation further comprising:

responsive to computing the path, transmitting a stack of labels to the headend node comprising (i), (ii), and (iii), wherein the stack of labels configures the first domain border router and the second domain border router to forward traffic along a shortest interior gateway path through the respective domains.

8. The computer program product of claim 5, wherein the source domain comprises the first virtual node and the first intermediate domain comprises the first virtual node and a second virtual node, the operation further comprising:

adding a link from the headend node to the first virtual node; and adding a link between the first virtual node and the second virtual node.

9. A system comprising:

a plurality of network devices arranged in a plurality of domains, the plurality of network devices comprising:

a headend node in a source domain;

an endpoint node in a destination domain;

a first domain border router that connects the source domain and a first intermediate domain between the source domain and the destination domain; and a second domain border router that connects the source domain and the first intermediate domain; and a network controller configured to:

assign a segment identifier to the endpoint node;

assign a respective segment identifier to each domain of the plurality of domains, wherein each of the first domain border router and the second domain border router advertises both the segment identifier of the source domain and the segment identifier of the first intermediate domain;

compute a derived graph, wherein computing the derived graph comprises:

assigning the first domain border router and the second domain border router to a first virtual node associated with the segment identifiers of the source domain and the first intermediate domain;

removing, from the derived graph, all nodes from the source domain except the headend node and the first virtual node; and removing, from the derived graph, all nodes from the first intermediate domain except any virtual nodes; and compute a path from the headend node to the endpoint node based on the derived graph, wherein the path includes (i) segment identifiers of any intermediate domains between the headend node and the endpoint node including the segment identifier of the first intermediate domain, (ii) the segment identifier of the destination domain, and (iii) the segment identifier of the endpoint node.

10. The system of claim 9, wherein the respective segment identifier assigned to each domain of the plurality of domains is an anycast domain segment identifier.

11. The system of claim 10, wherein the network controller is further configured to:

responsive to computing the path, transmit a stack of labels to the headend node comprising (i), (ii), and (iii), wherein the anycast domain segment identifiers configure first the domain border router and the second domain border router to forward traffic along a shortest interior gateway path through the respective domains.

12. The system of claim 9, wherein one or more intermediate domains are arranged between the source domain and the destination domain.

* * * * *